Patented Feb. 3, 1942

2,272,044

UNITED STATES PATENT OFFICE 2,272,044

INSECT REPELLENT

Roscoe H. Carter, Washington, D. C., assignor to Henry A. Wallace, as Secretary of Agriculture of the United States of America, and his successors in office No Drawing. Application June 25, 1940, Serial No. 342,298

1 Claim. (Cl. 167—33)

(Granted under the act of March 3, 1883, as amended April 30, 1928; 370 O. G. 757)

This application is made under the act of March 3, 1883, as amended by the act of April, 30, 1928, and the invention herein described and claimed, if patented, may be manufactured and used by or for the Government of the United States of America for governmental purposes without the payment to me of any royalty thereon.

This invention relates to a compound useful as an insect repellent. It also relates to a method of preparing such a compound.

Thiuram disulfides are the type of compounds containing the typical linkage:

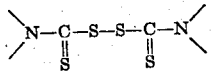

an example of which is tetramethyl thiuram disulfide, a well-known chemical compound.

An object of this invention is to provide a sulfur compound of the thiuram disulfide type in which, however, each nitrogen is a member of a heterocyclic ring containing also carbon and oxygen.

I have found that the product of the reaction between two mols of morpholine (tetrahydro 1,4,2-oxazine) in aqueous solution and one mol of carbon disulfide is a compound which I describe as the morpholine salt of the di-thio-carbamic acid of morpholine. I have further found that when this morpholine salt is treated with iodine, a reaction takes place with the formation of the di-morpholine thiuram disulfide. This compound is an insoluble slightly yellow powder. It is entirely possible that other mild oxidizing agents would cause this same reaction.

The following example will serve as an illustration of a method for carrying out my invention, but it is not to be construed as a limitation on the method.

Example

One hundred grams of morpholine was dissolved in 100 grams of water. After the solution had cooled, 44 grams of carbon disulfide was added through a reflux condenser with stirring. Considerable heat was developed and a solid material was precipitated out. This material was filtered off, washed with water and dried. To a solution of this material was added an alcoholic solution of iodine. The iodine solution was decolorized and a solid material was precipitated out.

This material was filtered off, washed with water and dried. It was a slightly yellow power insoluble in water and soluble in organic solvents such as alcohol, acetone and carbon tetrachloride. It had a melting point of 135° C.–135.5° C. Analyses of this material for sulfur gave results agreeing closely with the theoretical sulfur content for di-morpholine thiuram disulfide.

This compound, I have found, is effective as an insect repellent. Tests made against the Japanese beetle in dust applications, consisting of 2 parts talc and 1 part test material, showed a repellency rating greater than 8 pounds of acid lead arsenate, which is considered to be a maximum dosage for arsenate.

Having thus described my invention, what I claim for Letters Patent is:

I claim:

An insect repellent containing as its essential active ingredient di-morpholine thiuram disulfide.

ROSCOE H. CARTER.